US008756513B1

(12) United States Patent
Schmieder et al.

(10) Patent No.: US 8,756,513 B1
(45) Date of Patent: Jun. 17, 2014

(54) DOCUMENT VIEWING MECHANISM FOR DOCUMENT SHARING ENVIRONMENT

(75) Inventors: Robert W. Schmieder, Issaquah, WA (US); Ido M. Ben-Shachar, Sammamish, WA (US); Ivan J. Leichtling, Redmond, WA (US); Deana Rae Fuller, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2229 days.

(21) Appl. No.: 10/127,951

(22) Filed: Apr. 23, 2002

(51) Int. Cl.
*G06F 3/00* (2006.01)

(52) U.S. Cl.
USPC .......................................... 715/753; 715/759

(58) Field of Classification Search
USPC ......... 715/781, 758, 788–790, 792, 794, 759, 715/751–755, 798–802, 804, 811, 806, 807, 715/730, 746, 831
See application file for complete search history.

(56) References Cited

U.S. PATENT DOCUMENTS

| | | | |
|---|---|---|---|
| 4,386,416 A | 5/1983 | Giltner et al. |
| 4,631,521 A | 12/1986 | El-Sherbini |
| 4,672,459 A | 6/1987 | Kudo |
| 4,677,649 A | 6/1987 | Kunishi et al. |
| 4,783,834 A | 11/1988 | Anderson et al. |
| 4,814,987 A | 3/1989 | Miyao et al. |
| 4,823,122 A | 4/1989 | Mann et al. |
| 4,882,687 A | 11/1989 | Gordon |
| 4,897,799 A | 1/1990 | Le Gall et al. |
| 4,965,677 A | 10/1990 | Pennebaker et al. |
| 4,974,173 A | 11/1990 | Stefik et al. |
| 5,008,853 A | 4/1991 | Bly et al. |
| 5,057,916 A | 10/1991 | Krause et al. |
| 5,077,732 A | 12/1991 | Fischer et al. |
| RE33,894 E | 4/1992 | Bradley |
| 5,172,103 A | 12/1992 | Kita |
| 5,177,622 A | 1/1993 | Yoshida et al. |
| 5,179,711 A | 1/1993 | Vreeland |
| 5,206,934 A | 4/1993 | Naef, III |
| 5,210,825 A | 5/1993 | Kavaler |
| 5,241,625 A | 8/1993 | Epard et al. |
| 5,241,653 A | 8/1993 | Collins et al. |
| 5,255,361 A | 10/1993 | Callaway et al. |
| 5,287,203 A | 2/1994 | Namizuka |
| 5,298,992 A | 3/1994 | Pietras et al. |
| 5,319,463 A | 6/1994 | Hongu et al. |
| 5,390,262 A | 2/1995 | Pope |

(Continued)

OTHER PUBLICATIONS

Screen Dumps of Microsoft Word 2000, Jun. 10, 1999 (pp. 1-8).*

(Continued)

*Primary Examiner* — Doon Chow
*Assistant Examiner* — Le Nguyen
(74) *Attorney, Agent, or Firm* — Sonia Cooper; Jim Ross; Micky Minhas

(57) ABSTRACT

An improved application sharing system and method are described wherein a display of shared information is constructed such that application artifacts that are of no use to the viewer are not displayed to the viewer. In this way, a greatest possible portion of a viewing area can be used to display document content rather than such artifacts. In an embodiment, the functionality of reducing the display in this manner is engageable and disengageble by a viewing user. In a further embodiment of the invention, the functionality of reducing the display is automatically engaged and disengaged based on actions of a sharing user with respect to the shared information.

18 Claims, 8 Drawing Sheets

(56) References Cited

U.S. PATENT DOCUMENTS

| | | | |
|---|---|---|---|
| 5,404,436 A | 4/1995 | Hamilton | |
| 5,408,600 A | 4/1995 | Garfinkel et al. | |
| 5,485,559 A | 1/1996 | Sakaibara et al. | |
| 5,491,780 A | 2/1996 | Fyles et al. | |
| 5,550,968 A | 8/1996 | Miller et al. | |
| 5,565,886 A | 10/1996 | Gibson | |
| 5,608,872 A | 3/1997 | Schwartz et al. | |
| 5,625,809 A | 4/1997 | Dysart et al. | |
| 5,649,104 A | 7/1997 | Carleton et al. | |
| 5,655,152 A | 8/1997 | Ohnishi et al. | |
| 5,673,371 A | 9/1997 | Koopman et al. | |
| 5,699,524 A | 12/1997 | Ooishi et al. | |
| 5,717,856 A | 2/1998 | Carleton et al. | |
| 5,727,155 A | 3/1998 | Dawson | |
| 5,754,873 A | 5/1998 | Nolan | |
| 5,758,110 A * | 5/1998 | Boss et al. | 715/751 |
| 5,760,769 A | 6/1998 | Petrie | |
| 5,781,732 A | 7/1998 | Adams | |
| 5,826,051 A | 10/1998 | Porter et al. | |
| 5,831,872 A | 11/1998 | Pan et al. | |
| 5,835,713 A | 11/1998 | FitzPatrick et al. | |
| 5,841,420 A | 11/1998 | Kaply et al. | |
| 5,847,706 A | 12/1998 | Kingsley | |
| 5,864,711 A | 1/1999 | Mairs et al. | |
| 5,933,597 A | 8/1999 | Hogan | |
| 5,938,724 A | 8/1999 | Pommier et al. | |
| 5,949,435 A | 9/1999 | Brock et al. | |
| 5,959,717 A * | 9/1999 | Chaum | 352/40 |
| 5,986,655 A | 11/1999 | Chiu et al. | |
| 6,008,804 A | 12/1999 | Pommier et al. | |
| 6,031,530 A * | 2/2000 | Trueblood | 715/791 |
| 6,057,835 A | 5/2000 | Sato et al. | |
| 6,167,433 A | 12/2000 | Maples et al. | |
| 6,173,315 B1 | 1/2001 | Deleeuw | |
| 6,191,797 B1 | 2/2001 | Politis | |
| 6,212,547 B1 * | 4/2001 | Ludwig et al. | 709/204 |
| 6,216,177 B1 | 4/2001 | Mairs | |
| 6,219,044 B1 | 4/2001 | Ansberry et al. | |
| 6,230,171 B1 | 5/2001 | Pacifici et al. | |
| 6,271,839 B1 | 8/2001 | Mairs et al. | |
| 6,275,223 B1 | 8/2001 | Hughes | |
| 6,285,363 B1 | 9/2001 | Mairs et al. | |
| 6,292,166 B1 | 9/2001 | Palmer et al. | |
| 6,304,928 B1 | 10/2001 | Mairs | |
| 6,308,199 B1 | 10/2001 | Katsurabayashi | |
| 6,317,777 B1 | 11/2001 | Skarbo et al. | |
| 6,329,984 B1 | 12/2001 | Boss et al. | |
| 6,342,906 B1 | 1/2002 | Kumar et al. | |
| 6,343,313 B1 | 1/2002 | Salesky et al. | |
| 6,343,316 B1 | 1/2002 | Sakata et al. | |
| 6,356,279 B1 | 3/2002 | Halstead, Jr. et al. | |
| 6,380,940 B1 | 4/2002 | Halstead, Jr. et al. | |
| 6,456,305 B1 | 9/2002 | Qureshi et al. | |
| 6,460,126 B1 | 10/2002 | Spilo et al. | |
| 6,469,716 B1 | 10/2002 | Carter et al. | |
| 6,564,246 B1 | 5/2003 | Varma et al. | |
| 6,570,590 B1 * | 5/2003 | Dubrow et al. | 715/751 |
| 6,577,330 B1 | 6/2003 | Tsuda et al. | |
| 6,584,466 B1 | 6/2003 | Serbinis et al. | |
| 6,584,493 B1 | 6/2003 | Butler | |
| 6,601,087 B1 | 7/2003 | Zhu et al. | |
| 6,654,032 B1 | 11/2003 | Zhu et al. | |
| 6,697,846 B1 | 2/2004 | Soltis | |
| 6,741,266 B1 * | 5/2004 | Kamiwada et al. | 715/768 |
| 6,760,048 B1 * | 7/2004 | Bates et al. | 715/797 |
| 6,823,514 B1 | 11/2004 | Degenerato | |
| 6,825,860 B1 | 11/2004 | Hu et al. | |
| 6,826,595 B1 | 11/2004 | Barbash et al. | |
| 6,833,844 B1 | 12/2004 | Shiota et al. | |
| 6,859,928 B2 | 2/2005 | Wright | |
| 6,910,188 B2 | 6/2005 | Keohane et al. | |
| 6,911,987 B1 | 6/2005 | Mairs et al. | |
| 6,925,645 B2 * | 8/2005 | Zhu et al. | 718/106 |
| 6,944,662 B2 | 9/2005 | Devine et al. | |
| 6,973,627 B1 | 12/2005 | Appling | |
| 7,003,728 B2 | 2/2006 | Berque | |
| 7,008,871 B2 | 3/2006 | Andricacos et al. | |
| 7,028,266 B2 | 4/2006 | Ben-Shachar et al. | |
| 7,046,253 B2 | 5/2006 | Long et al. | |
| 7,088,871 B2 | 8/2006 | Mairs et al. | |
| 7,127,460 B2 | 10/2006 | Nixon et al. | |
| 7,203,755 B2 | 4/2007 | Zhu et al. | |
| 7,293,243 B1 | 11/2007 | Ben-Shachar et al. | |
| 7,340,500 B2 | 3/2008 | Traversat et al. | |
| 7,356,563 B1 | 4/2008 | Leichtling et al. | |
| 7,404,014 B2 | 7/2008 | Mairs et al. | |
| 7,414,638 B2 | 8/2008 | Ben-Shachar et al. | |
| 7,418,664 B2 | 8/2008 | Ben-Shachar et al. | |
| 7,451,181 B2 | 11/2008 | Sasaki et al. | |
| 7,487,457 B2 | 2/2009 | Ben-Shachar et al. | |
| 7,530,022 B2 | 5/2009 | Ben-Shachar et al. | |
| 7,595,798 B2 | 9/2009 | Ben-Shachar et al. | |
| 7,721,223 B2 | 5/2010 | Ben-Shachar et al. | |
| 8,082,517 B2 | 12/2011 | Ben-Shachar et al. | |
| 2001/0000811 A1 | 5/2001 | May et al. | |
| 2002/0026323 A1 | 2/2002 | Sakaguchi et al. | |
| 2002/0065919 A1 | 5/2002 | Taylor et al. | |
| 2002/0075304 A1 | 6/2002 | Thompson et al. | |
| 2002/0078443 A1 * | 6/2002 | Gadkari et al. | 725/32 |
| 2002/0174181 A1 | 11/2002 | Wei | |
| 2003/0028610 A1 | 2/2003 | Pearson | |
| 2003/0085922 A1 | 5/2003 | Wei | |
| 2003/0103088 A1 | 6/2003 | Dresti et al. | |
| 2003/0137522 A1 | 7/2003 | Kaasila et al. | |
| 2003/0140044 A1 | 7/2003 | Mok et al. | |
| 2003/0167339 A1 | 9/2003 | Zhu et al. | |
| 2004/0066408 A1 | 4/2004 | Meyers et al. | |
| 2004/0172588 A1 * | 9/2004 | Mattaway | 715/500.1 |
| 2004/0260717 A1 | 12/2004 | Albornoz et al. | |
| 2005/0033817 A1 | 2/2005 | Wei | |
| 2005/0055306 A1 | 3/2005 | Miller et al. | |
| 2005/0081239 A1 * | 4/2005 | Makowski et al. | 725/35 |
| 2006/0190839 A1 | 8/2006 | Ben-Shachar et al. | |
| 2006/0288389 A1 | 12/2006 | Deutscher et al. | |
| 2008/0034320 A1 | 2/2008 | Ben-Shachar et al. | |
| 2008/0183817 A1 | 7/2008 | Baek et al. | |
| 2009/0037821 A1 * | 2/2009 | O'Neal et al. | 715/732 |

OTHER PUBLICATIONS http://www.microsoft.com/windows/netmeeting/.*

Gutekunst, Thomas et al., "A Distributed and Policy-Free General-Purpose Shared Window System," Oct. 6, 1994, Feb. 1995 IEEE/ACM Transactions on Networking, 13 pages.

Schroeder, Erica, "PictureTel Plans Low-Cost Video App Sharing," PC Week, vol. 11, No. 25, Jun. 27, 1994, pp. 1 & 171.

Intel Corporation, "Intel ProShare Personal Conferencing Software, Getting Started Guide," Intel Corporation, 1994, pp. 25-31.

Schroeder, Erica, "Videoconferencing—Creative brings Mac package to Windows," Networking, PC Week, vol. 11, No. 25, Jun. 27, 1994, pp. 83 & 88.

"A Primer on the T.120 Series Standard," DataBeam Corporation, pp. 1-13, 1995.

IBM, IBM Technical Disclosure Bulletin Automatic Window Management Mode, vol. 35, No. 4B, Sep. 1992.

* cited by examiner

DOCUMENT VIEWING MECHANISM FOR DOCUMENT SHARING ENVIRONMENT

TECHNICAL FIELD

This invention relates generally to the technology of application sharing and, more particularly, relates to a system and method for improving a viewer's experience during application sharing.

BACKGROUND

As computers and computer networks become more pervasive in the home and workplace, many established methods for performing everyday tasks are being replaced or streamlined through the use of computer networking technology. For example, employees are increasingly able to have a virtual presence in their workplace by logging into a computer network maintained by their employer. Perhaps the most striking development in computer networking technology today has been the advent of remote collaboration.

One of the oldest forms of processing data is the meeting or conference, whereby multiple individuals focus their attention on common subject matter to arrive at a joint decision, consensus, or product. Increasingly, such meetings are now taking place virtually over computer networks through the use of application sharing technologies. Such technologies enable a sharing user to share an application with various viewing users. The display produced by the application running on the sharer's computer is made available via a computer network to the viewers' computers. In some cases, the sharer may pass control of the application to a viewer, whereby that viewer's control inputs are then communicated back to the sharer's computer, where the actions associated with the inputs are executed, and the resulting changed display is shared back out to all viewers.

Although application sharing has many clear benefits and can play a critical role in maintaining or increasing productivity and cooperation, current application sharing systems sometimes create a less than ideal user experience. For instance, the viewer display properties often are not optimized to suit the purposes of the sharer and viewer in sharing information. An example of this inefficiency appears in the way in which a particular window may be shared. Current systems generally display the shared window as it appears on the sharer's display, without accounting for the fact that only a subset of the window information is useful to the viewer. For example, when the viewer is not controlling a shared application, it is inefficient to display tool bars, menus and other application artifacts to the viewer who by definition cannot activate them at that time.

In addition, the display of such artifacts consumes valuable viewer area, wherein useful data could be displayed. Often, the shared window or information is scaled for presentation on the viewer display, so that the entire shared area fits within an application sharing window. In many cases, this requires that the shared display be scaled down to a lower resolution on the viewer's display than it has on the sharer's display. This reduction sometimes results in a document area that is difficult for the viewer to read or discern.

A new system and method are needed whereby sharing of window information during application sharing can be executed efficiently without unnecessarily impacting the quality of the viewer display.

SUMMARY

A novel system and method are described for constructing a display of shared information and for displaying shared information, so that application artifacts that are of no use to the viewer are not displayed to the viewer, and so that a maximum available portion of a viewing area can be used to display document content rather than such artifacts.

In an embodiment, a viewer-activated document view mode allows the viewer to limit the display of shared windows to the document content of such windows, omitting toolbars, menus and other artifacts that convey no information to the viewer and that are not usable by the viewer.

In a further embodiment of the invention, the viewer display is modified to show one or more application artifacts when a portion of one or more such artifacts intersects an application sharing view area on the viewer display.

BRIEF DESCRIPTION OF THE DRAWINGS

While the claims set forth features of the present invention with particularity, the invention, together with its objects and advantages, may be best understood from the following detailed description taken in conjunction with the accompanying drawings of which:

DETAILED DESCRIPTION

Figure 1:
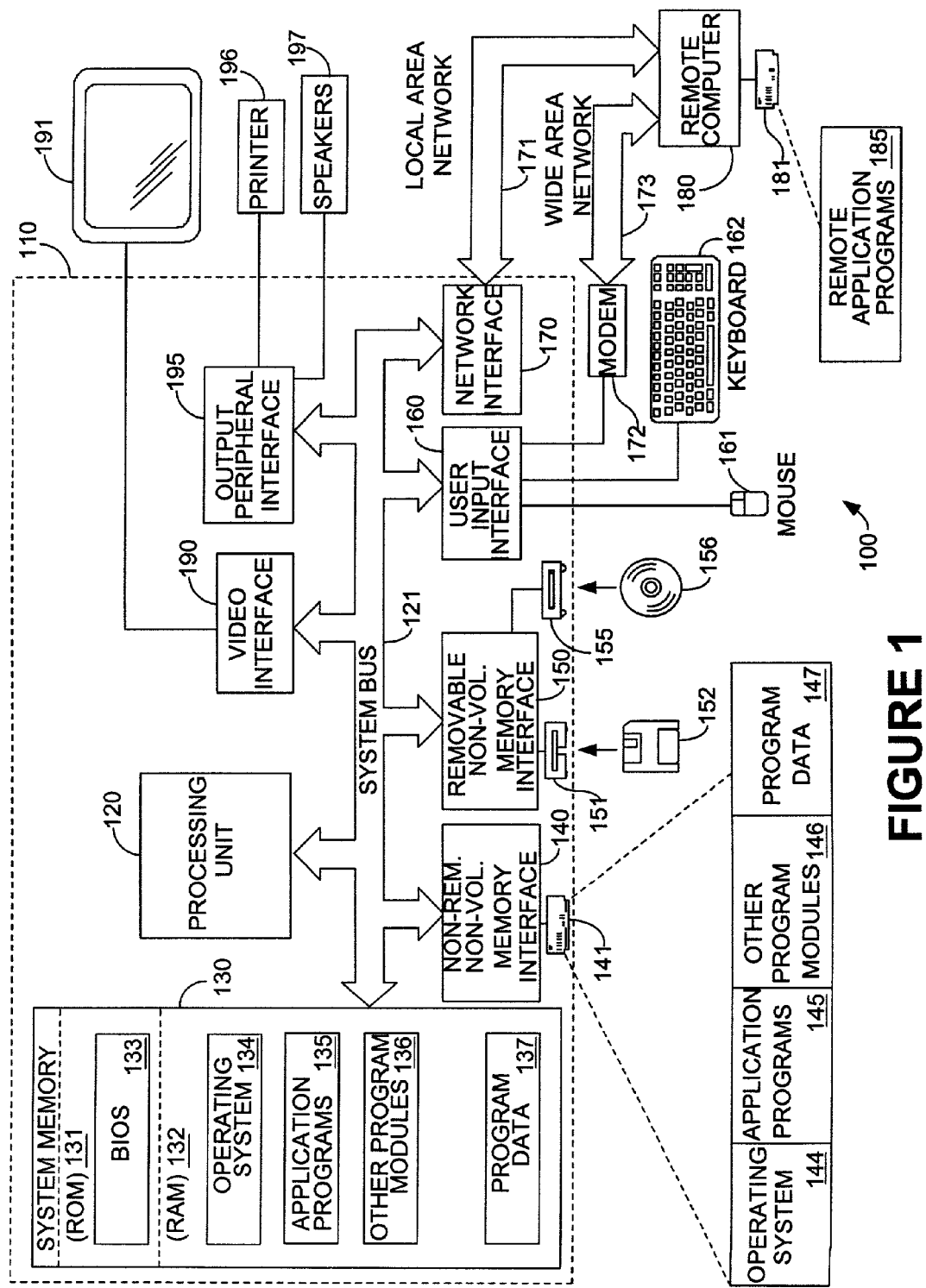
FIG. 1 is a block diagram generally illustrating an exemplary computer system usable in an implementation of an embodiment of the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention is primarily for use in a networked environment and may further be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 usable in an implementation of the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An exemplary system for implementing the invention includes a general-purpose computing device in the form of a computer 110. Components of the computer 110 generally include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example only, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics (such as, for example, voltage or current level, voltage or current pulse existence or nonexistence, voltage or current pulse width, voltage or current pulse spacing, etc.) set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates RAM 132 as containing operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162, pointing device 161 (commonly referred to as a mouse), and trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

In the implementation of an embodiment of the invention, the computer 110 operates in a networked environment using logical connections to one or more remote computers, such as a remote computer 180. The remote computer 180 may be a personal computer, a router, a network PC, a peer device or other common network node, and in any case the remote computer or computers typically include many or all of the elements described above relative to the personal computer 110, although only a memory storage device 181 has been illustrated in FIG. 1. The logical connections depicted in FIG. 1 include a local area network (LAN) 171 and a wide area network (WAN) 173, but the computer 110 may additionally or alternatively use one or more other networking environments. Networking environments of all types are commonplace in offices, enterprise-wide computer networks, intranets and the Internet.

The computer 110 should include facilities for accessing the networks to which it is attachable. For example, when used in a LAN networking environment, the personal computer 110 is connected to the LAN 171 through a network interface or adapter 170. Another node on the LAN, such as a proxy server, may be further connected to a WAN such as the Internet. When used in a WAN networking environment, the computer 110 typically includes a modem 172 or other means for establishing communications directly or indirectly over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. It is not intended to limit the invention to use in a hard-wired network environment, since it may also be used in transiently connected environments, such as for example a wholly or partially wireless network environment interconnected wholly or partially via optical, infrared, and/or radio frequency wireless connections.

Herein, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
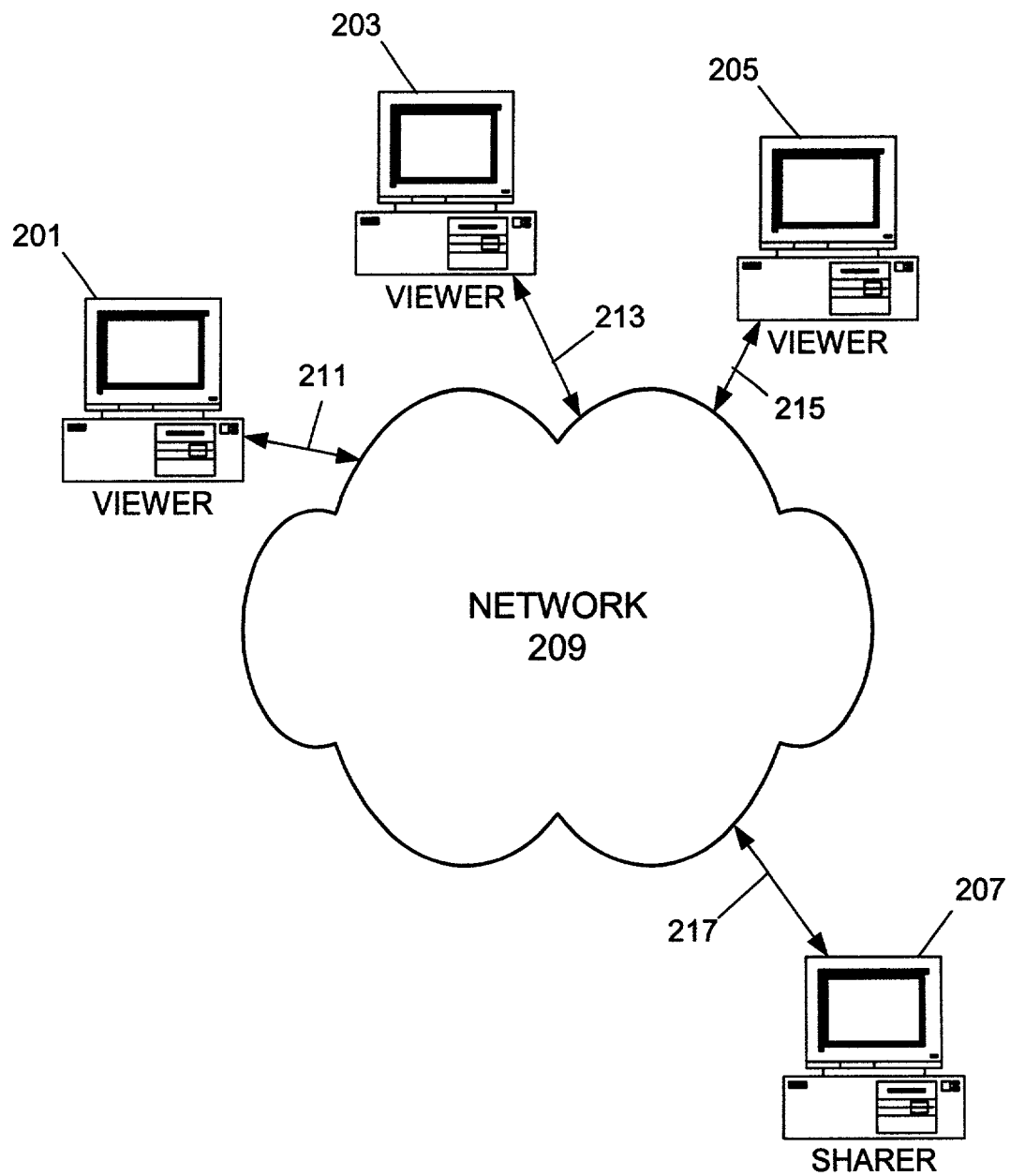
FIG. 2 is a schematic diagram showing the architecture of a network system within which an embodiment of the invention may be implemented, including multiple computers comprising a sharer computer and viewer computers.

FIG. 2 illustrates schematically a networking environment in which the present invention in preferably implemented. The architecture of such a system comprises one or more viewer computers illustrated as computers 201, 203, and 205, connected to a sharer computer 207 via a network 209. Each computer 201, 203, 205, 207 is connected or connectable to the network 209 and hence to the others of computers 201, 203, 205, 207 via network connections 211, 213, 215, and 217. The network connections 211, 213, 215, 217 and computers 201, 203, 205, 207 may be as discussed above more generally with respect to FIG. 1. The network may be of any type, including, for example, a LAN, such as found in an office, university or other setting, a WAN such as the Internet, a MAN, or any other tangible or intangible, fixed or transient mechanism for computer interconnectivity. While higher data transfer rates are generally preferable to lower data transfer rates, there is no limit or requirement as to the speed of the network 209. In addition, the network 209 may be a single network, or alternatively may be comprised of multiple networks of the same or different types and/or speeds. It will be understood that in many but not all cases, the network will further comprise routers, servers, and/or other computing devices in addition to the endpoint devices 201, 203, 205, 207 involved in the collaborative effort.

Figure 3:
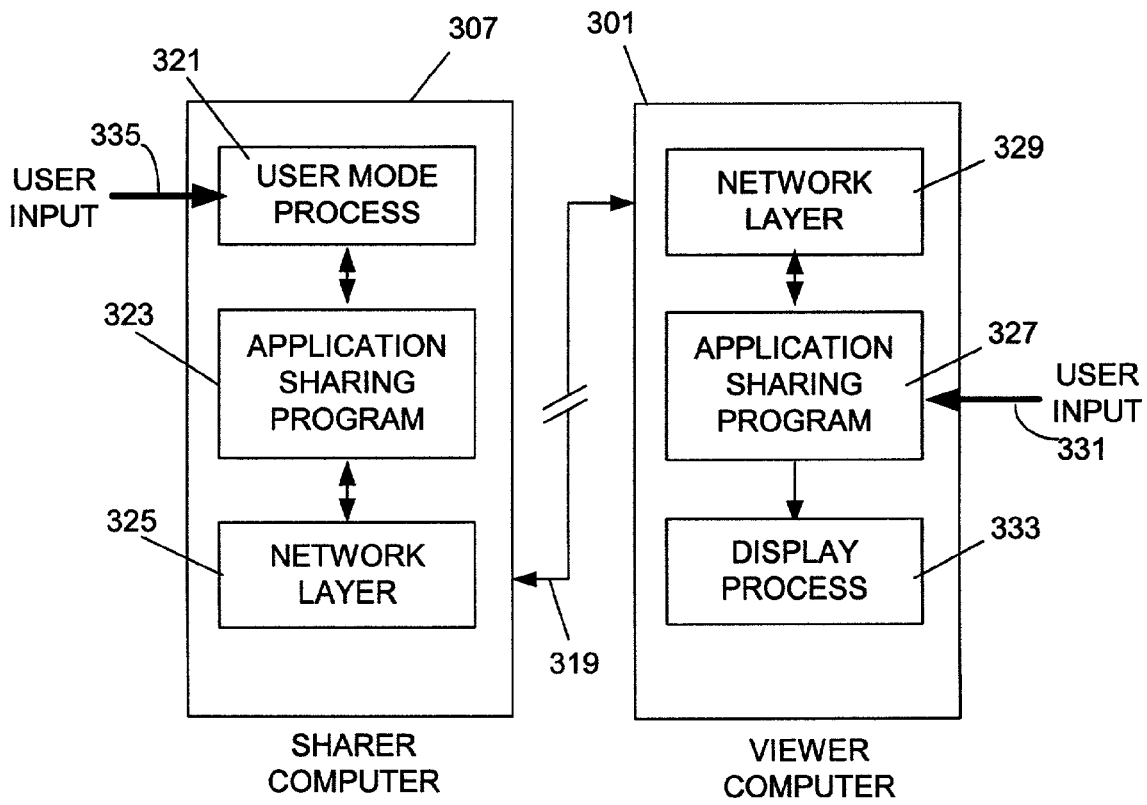
FIG. 3 is a schematic diagram illustrating in greater detail the placement and function of an application sharing program in an embodiment of the invention with respect to a sharer computer and a viewer computer.

Specific exemplary architectures of the sharer computer 207 and a viewer computer 201 are illustrated in greater detail schematically in FIG. 3. It will be understood that although only one viewer computer is illustrated in FIG. 3, there can be more than one such computer in an implementation of the invention, as illustrated by way of FIG. 2. Sharer computer 307 is illustrated as being connected via networking connection 319 to viewer computer 301. As will be appreciated by those of skill in the art, network connection 319 can include some or all of the network types and network connections discussed above, as well as other network types and connections alternatively or additionally.

One or more user mode processes of interest 321 are running on sharer computer 307. Such processes include processes, such as a program, from which information is being shared to one or more viewers such as at viewer computer 301. The processes of interest 321 will be referred to hereinafter as shared processes, with the understanding that the information generated by the processes 321 need not be shared completely. That is, the information shared may consist of only a subset of the information generated by such a process 321 for display. Many shared processes can also be used in a non-shared manner. For example, a word processing program may be used by the sharer for non-collaborative document production, and may then be used in a shared manner for group editing of the same or another document. In either mode, the processes 321 and the operating system of the sharer computer 307 perform certain steps. For example, whether or not the process 321 is shared, the output of the process 321 will still generally be output to the graphics display driver of the sharer computer 307.

If the application sharing program 323 is active, such as during a sharing session, then other processes unique to the collaborative setting also take place. In particular, the application sharing program 323, which is communicably linked to the process 321, receives information from the process 321 and transfers information to the process 321. Although the bi-directional flow of information between the process 321 and application sharing program is illustrated as being bi-directional, note that the mechanisms for transfer may vary depending upon direction of transfer. For example, the process 321 need not even be aware of the presence or operation of the application sharing program 323 for the application sharing program 323 to receive information from the process 321.

Typically, the application sharing program 323 is communicably linked to an interceptor filter placed in the display path for the process 321. Such a filter may be placed just before the graphics device interface (GDI) or similar interface in such a manner as to read, in a non-intrusive manner, all information sent to the screen of computer 307 by a shared process. In the WINDOWS operating system produced by MICROSOFT Corporation of Redmond, Wash., when an application wants to display an object, it calls a GDI function and sends the various parameters for the object. In turn, the GDI sends commands to the screen to cause it to actually paint the object. In contrast, the mechanism for transferring information from the application sharing program 323 to the process 321 need not involve the display path at all, and may instead involve a direct transfer of information.

Regardless, the application sharing program 323 is also communicably linked to the networking facilities 325 of the sharer computer 307. Such facilities 325 may include any networking communications stack or other protocol arrangement as well as the hardware required for accessing the network connection 319, as discussed above with respect to FIG. 1. Across the network connection 319, a counterpart application sharing program 327 running on the viewer computer 307 is communicably linked to the sharer computer 307 via the network connection 319 and the networking facilities 329 of the viewer computer. The networking facilities 329 may be similar to the networking facilities 325 of the sharer computer. The counterpart application sharing program 327 receives input from shared process 321 via the network connection 319 and also potentially from a user of the viewer computer 301, via one or more input channels 331, such as a keyboard, mouse, etc. as discussed above with respect to FIG. 1. Additionally, the counterpart application sharing program 327 outputs material for display to a display process 333 such as a GDI or similar interface, or other display process. Note that the sharing computer 307 also preferably includes input channels 335 such as those described above for receiving user input, some of which may be directed to and received by the process of interest 321.

The communication between the sharer computer 307 and the viewer computer 301 over the network connection 319 during application sharing may comprise a screen data stream, an input data stream, and an application data stream. The screen data stream represents or is associated with the display on the screen or display of the sharer computer 307, allowing the viewer computer 301 to reconstruct a bitmap representation of the shared window on its own associated display. The input data stream contains information regarding an interaction at the sharer or viewer of a user with an input device such as those described above with respect to FIG. 1. Finally, the application data stream contains data that allows the viewer to associate portions of the bitmap provided in the screen data stream with applications and/or windows produced by applications. In an embodiment of the invention, the beneficial functionality at the viewer machine 301 described herein may be facilitated via information placed into the application data stream by the application sharing program 323 at the sharer machine 307.

There are two primary types of windows that the application sharing program analyzes to perform many of the functions associated with embodiments described herein. These types of windows are shared windows and unshared windows. The application data stream contains information about the shared windows as well as information about unshared windows that are relevant to the shared area, such as because of overlap with a shared window. For each window of concern, the application data stream contains information regarding the window's shape, size, and z-order position. From this information, the application sharing program at the viewing machine can determine what portions of the bitmap representation of the sharing machine's desktop should be shown at the viewer. The area shown is termed the "shared region." The application data stream is further used by the application sharing program at the viewing machine to determine which portions of the sharer desktop should not be shown at the viewer. Such portions are termed "obscurable regions" or "obscured regions." A region within the shared region corresponding to document content in a shared window is termed a "document view region" on the viewer display corresponding to a "document sub-window" at the sharer display.

The calculation of a document view region in the shared window is based on an identification of the document sub-window of the currently viewed top-level window of the relevant shared application. Although the regions will often be identical in content, there are situations where other shared windows hosted by the relevant application are added to the document view region as will be discussed below.

Any one of a number of methods may be used to indicate that a shared window contains a document sub-window. For known applications that provide a mechanism for distinguishing the sub-windows, an internal table may be maintained for associating window classes with document sub-windows. Thus, the application sharing program can share the top-level window and place a document view mark on the window indicating the presence of the sub-window. Alternatively or additionally, an API provided by the application sharing program object manager can be called with a sub-window in order to share the top-level window and place a document view mark on the window indicating the presence of the sub-window. Finally, a third party application can mark its own windows with a global atom to identify the presence and sharing of a sub-window. In this case, the application should use a recognized document view indicator, such as an atom name, and should use the appropriate operating system interaction mechanisms, such as Win32 APIs if the operating system is the WINDOWS brand operating system produced by MICROSOFT Corporation of Redmond, Wash.

Once a document view sub-window is identified, the application sharing program determines a bounding rectangle, such as by intersecting a document view sub-window with its ancestors. The sub-window bounding rectangle is then used to determine if any other top-level windows intersect the document view region. If a top-level window intersects the region but is not the parent of the document view sub-window, then the bounding rectangle is made to include that top-level window.

The general operation of the architecture and components usable in embodiments of the invention will be described briefly in overview before giving a detailed exposition of the processes involved in embodiments of the invention. In an embodiment of the invention, a shared window is displayed on the viewing machine 301 omitting certain application artifacts that are displayed on the sharer machine 307 when the application sharing program on the viewing machine 301 operates in a document view mode. Such artifacts include menus, toolbars, etc. that are displayed at the sharer machine by the shared application to allow the sharing user to affect operation of a shared application. The document view mode discussed herein can preferably be automatically engaged or disengaged, and is preferably also engageable and disengageable by a user of the viewing computer.

Figure 4A:
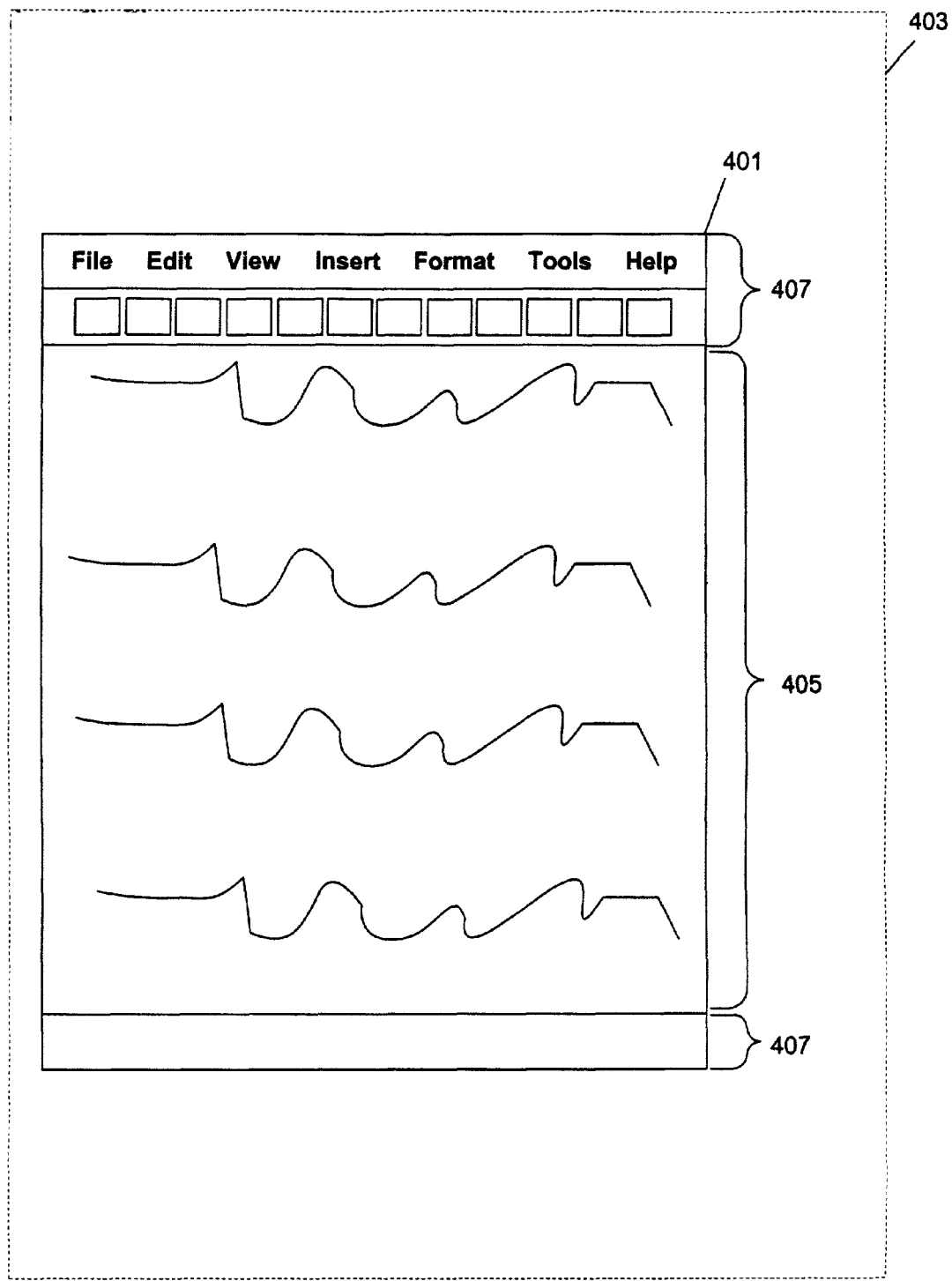
FIG. 4A is a simplified sharer screen representation showing a sharer display of a shared window including application artifact information such as a toolbar.
Figure 4B:
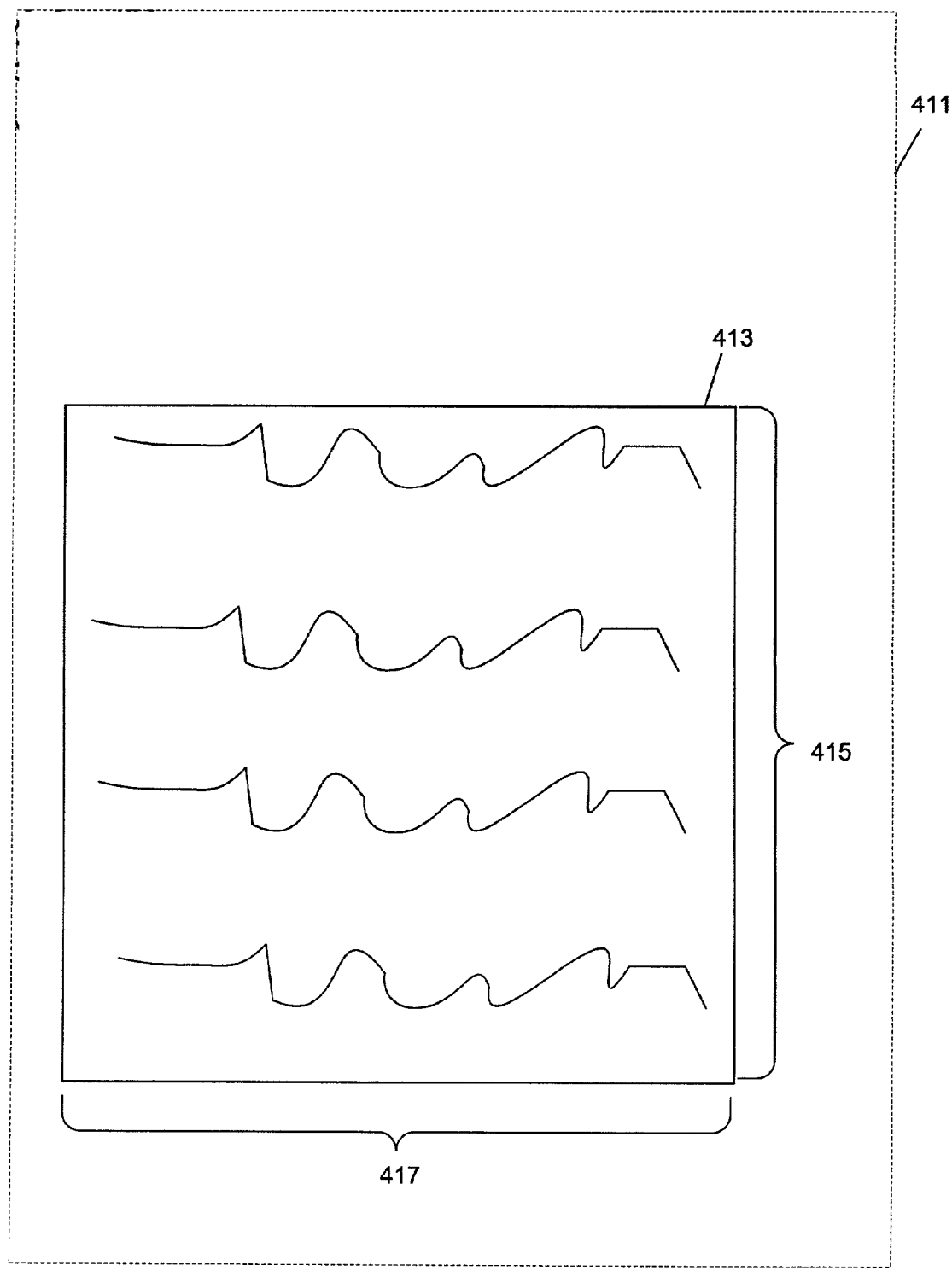
FIG. 4B is a simplified viewer screen representation showing a sharer display of a shared window omitting application artifact information such as a toolbar.

The effect of the document view mode on the viewer display can be seen in overview by way of FIGS. 4A and 4B. FIG. 4A is a simplified screen display representation of a shared application window on the sharer display. It can be seen that shared window 401 in display 403 has a document content area 405 and one or more application artifact areas

407. It will be understood that references herein to an application artifact area in the singular sense includes the case where the application artifact area is dispersed in two or more non-contiguous areas such as illustrated in FIG. 4A, as well as the case where the application artifact area is localized in one contiguous area. The four arcuate shapes illustrated within the document content area 405 and other regions in the figures are intended to represent any appropriate user-created document content such as text, drawing, etc.

FIG. 4B is a simplified screen display representation of the shared application window of FIG. 4A on a viewer display. The viewer display area 411 contains a representation 413 of the shared window. It can be seen that the viewer representation 413 of the shared window does not contain the application artifact areas 407 shown in FIG. 4A. Rather, the entire application sharing display area 417 is substantially filled with data 415 corresponding to the document content area 405 of the corresponding shared window on the sharer display. In this manner, the application sharing display area 417 is efficiently utilized to only display that information which it is important for the viewer to see. Thus, the size of fonts and other elements shown within the application sharing display area 417 may be larger than they would be if the user were to be presented with the entire contents of the shared window 403. This is especially important when the application sharing display area 417 is substantially smaller than the shared window 403, necessitating in most cases some amount of down scaling of the content of the document content area 405 of the shared window. In such cases, the scaled down content will remain more legible in the document view mode, wherein only document content is shown to the viewer, than it otherwise would, enhancing the viewer's experience during application sharing, and enhancing the usefulness of the application sharing session to the sharing user.

In some cases, the transformation of the viewer display of the shared window as described above will even result in a magnification of the document content, while existing systems that do not transform the display would require at least minimal shrinkage of the document content. Such can occur when the application sharing display area 417 is smaller than the shared window 403 but larger than the document content area 405 of the shared window 403.

There are primarily two situations when the application sharing program at the viewing machine preferably automatically shifts from a mode in which the shared window is transformed as described above to a mode where the shared window is not transformed and thus displays all or some application artifacts in an application artifact area. The first such case is when the sharing user performs an action at the sharing computer that creates a child shared window that is partially contained in the document content and application artifact areas of the shared window 403.

Figure 5:
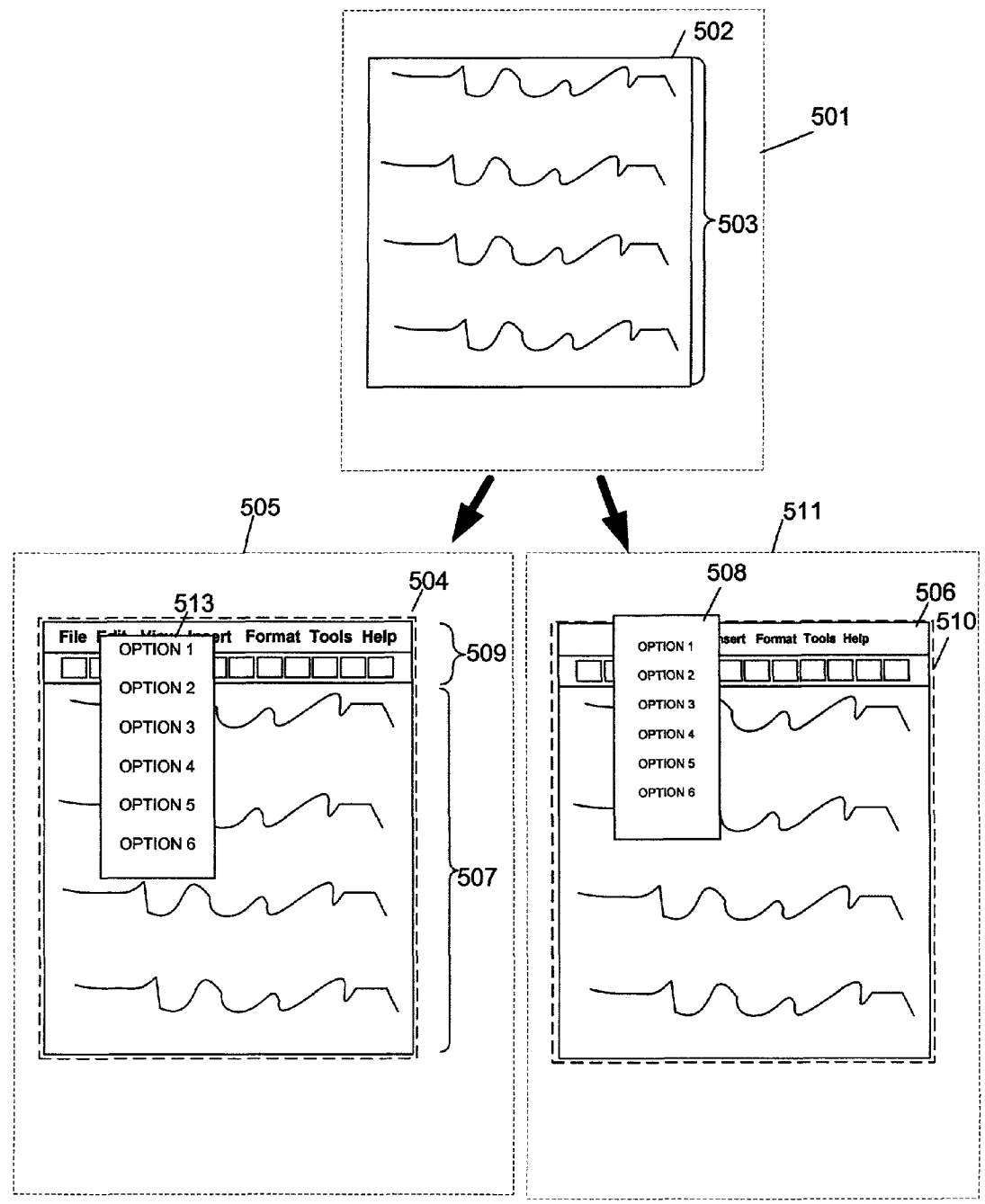
FIG. 5 depicts simplified screen representations showing exemplary viewer displays before and after a sharing user performs an action at the sharing computer that creates a shared window that is at least partially contained in the document content area of the shared window.

Exemplary viewer displays before and after such an action are illustrated in FIG. 5. In particular, display 501 corresponds to the shared window as displayed at the =viewing machine before an additional shared window that overlaps the document content area at the sharing machine is created. The display 502 of the shared window corresponds to that of FIG. 4B, and contains only document content 503 and does not contain an area corresponding to an application artifact area such as areas 407 in FIG. 4A. When the user of the sharing machine subsequently performs an action at the sharing computer that creates a shared window that is partially contained in the document content area of the shared window 403 and partially contained in the application artifact area 407, the viewer display of the shared window transforms to one such as that shown at display 505. For example, such an action may be the activation of a toolbar item to create a drop-down menu 513. When a shared window such as the drop down window list 513 partially overlaps the document content area 405 and the application artifact area at the sharing computer, the mode of the application sharing program at the viewing computer is switched such that the viewer display 504 of the shared window no longer omits application artifact areas, and hence does not omit any portion of the new window. Thus, the shared window 504 as displayed in display 505 contains a document content area 507 as well as an application artifact area 509 corresponding to associated areas in the sharing machine display of the shared window. Note that if the new window 508 lies partially within the document content area and application artifact area, and partially outside of the shared window on the sharer display, then the viewer display scale of the shared window 506 is adjusted as shown in display 511 so that the entirety of the new window 508 is shown without clipping. Alternatively, the relative displayed sizes of the shared window 506 and the new window 508 may be diminished so that the entirety of the child image is displayed within the application sharing area 510.

The second case wherein the mode of the application sharing program at the viewing computer is switched to display application artifact areas is when such areas become usable by the viewing user. For example, when a sharing user cedes control of a shared application or document to the viewing user, the viewing user is preferably able to access and activate toolbar items and to make selections of options displayed by icon or otherwise in the application artifact area. Additionally, the viewing user is preferably able to manually deactivate the document view mode so that the viewing computer display always shows the entire shared window including application artifact areas. This mode may be useful when the application artifacts are not usable by the viewing user but are nonetheless important to the viewing user, such as when a sharing user is showing a viewing user how to use an application.

Figure 6:
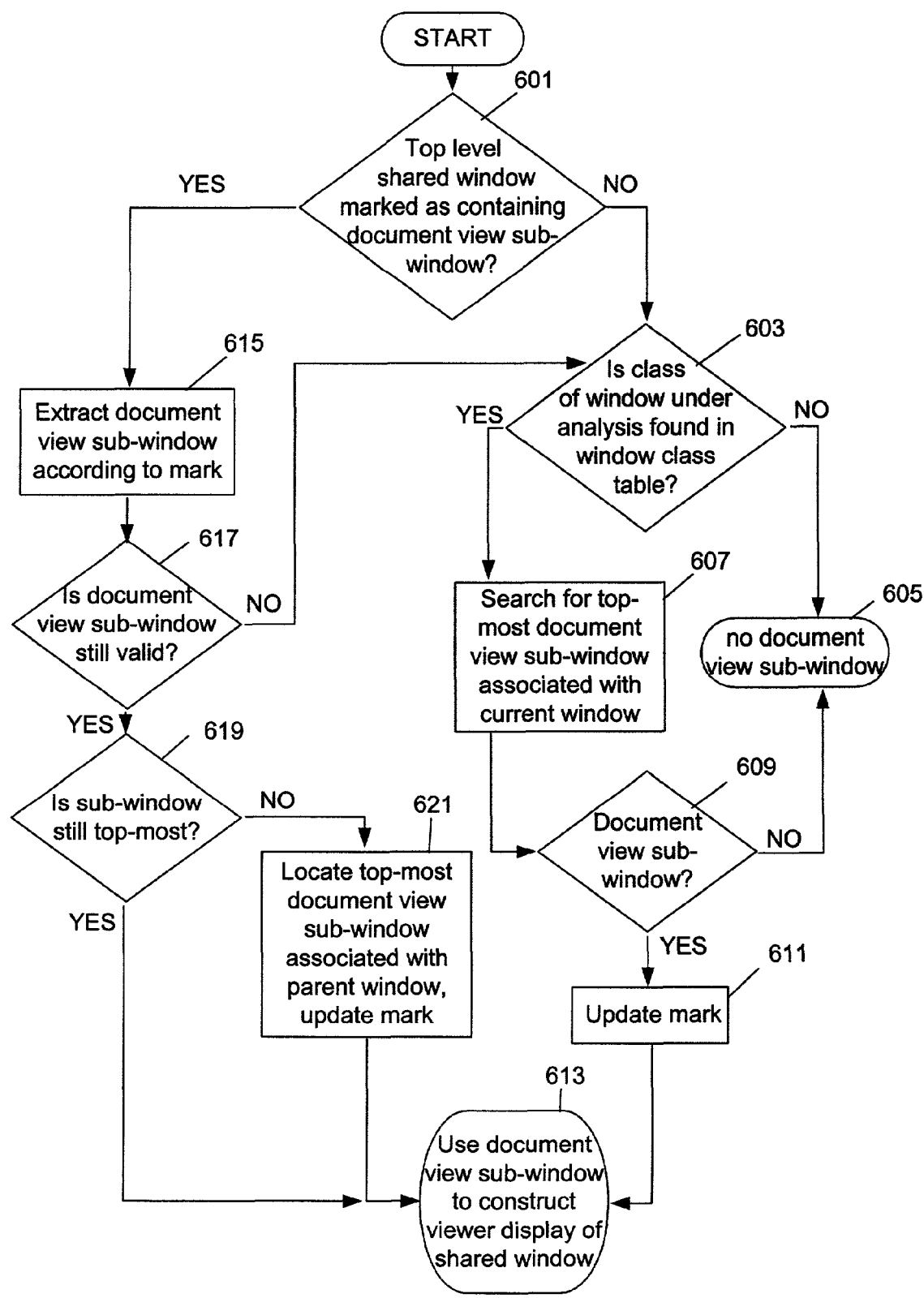
FIG. 6 is a flow chart illustrating a process for identifying a document view sub-window according to an embodiment of the invention.

The processes involved in constructing the viewer display of a shared window is described hereinafter in greater detail with reference to FIGS. 6 and 7. In particular, FIG. 6 illustrates a flow chart for a process of identifying a document view sub-window. The process is preferably executed by the application sharing program running on the sharing machine, although such is not required to be the case. In step 601, the program determines whether a particular top level shared window is marked, such as by a global atom, as containing a document view sub-window. If the window is not so marked, then in step 603, the program determines whether the window class corresponding to the window under analysis is found in a window class table. The window class table associates known window classes with their sub-window classes, and is preferably pre-populated such as prior to distribution of the application sharing program, but may be alternatively populated through use by the application sharing program, or may be populated or augmented by a third party.

If at step 603 it is determined that the window class corresponding to the window under analysis is not in the window class table, then the process terminates for that window at node 605 having determined that no identifiable document view sub-window exists in the window under analysis. If instead at step 603 it is determined that the window class corresponding to the window under analysis is in the window class table, then the process flows to step 607 where, having identified the class of the relevant one or more document sub-windows, the program searches for the top-most document view sub-window associated with the window under analysis.

At step 609, the program determines whether a document view sub-window was identified in step 607. If such a document view sub-window has been identified, then the process flows to step 611, where the mark on the sub-window is updated to indicate that the identified sub-window is the top-most document view sub-window for the associated application. Finally, the process terminates at step 613, where the identified and marked document view sub-window is utilized to facilitate construction of the viewer display of the shared window. However, it is instead determined at step 609 that a document view sub-window was not identifiable in step 607, then the process terminates at node 605, having determined that no identifiable document view sub-window exists in the window under analysis. Note that the document window mark can be added to a shared window by the application that is shared, and in this case the application need not fill or modify the class table.

Alternatively, if at step 601 it was determined that the top level shared window under analysis is marked as containing a document view sub-window, then the process flows to step 615, where the document view sub-window is extracted according to the mark. Subsequently, at step 617, the application sharing program determines whether the extracted document view sub-window is still valid. For example, if the sub-window was closed after the parent window was marked, then the sub-window may be considered invalid. If it is determined at step 617 that the extracted document view sub-window is no longer valid, then the process continues to step 603 and the steps that logically follow thereafter. If instead it is determined at step 617 that the extracted document view sub-window is still valid, then the process moves to step 619.

At step 619 the program determines whether the identified sub-window is still top-most of the document sub-windows associated with the same parent window. If at step 619 it is determined that the identified sub-window is still top-most, then the process terminates at node 613. If instead it is determined that the identified sub-window is not still top-most, then the process flows to step 621, where the program locates the top-most document view sub-window associated with the parent window under analysis and updates the mark thereon. Subsequently, the process terminates at node 613. Note that a document view sub-window can become invalid by loosing activation. That is, if there are two MDI child windows and the one that it is indicated by the mark becomes deactivated, with the other window being activated instead, then the first window may be considered invalid. It can be seen that at the conclusion of the process shown in the flow chart of FIG. 6, either a document view sub-window of interest will have been found, or it will have been determined that there exists no identifiable document view sub-window. In the former case, a document view is constructed according to a process to be discussed hereinafter, while in the latter, the viewer display of the shared window does not use a document view, but instead shows the entire shared window as it appears on the sharer display.

Figure 7:
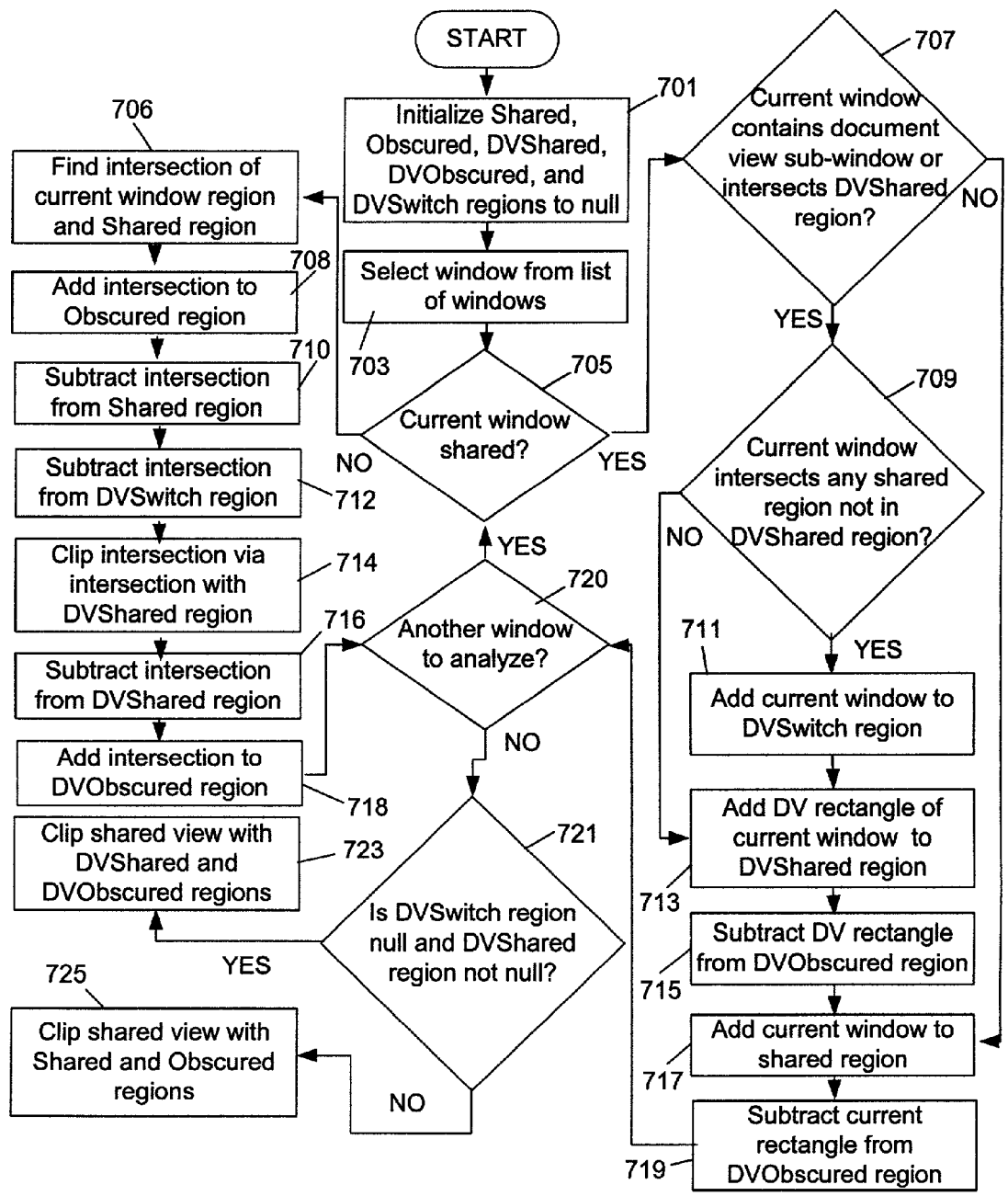
FIG. 7 is a flow chart illustrating a process for constructing a display of a shared window at the viewing machine upon receipt of window data from the sharing machine according to an embodiment of the invention.

The flow chart of FIG. 7 illustrates a process by which a display of the shared window is constructed at the viewing machine upon receipt of a list of window data from the sharing machine. Note that the process of FIG. 7 processes window data to operate on five regions: a Shared region, an Obscured region, a DVShared region, a DVObscured region, and a DVSwitch region. The process of FIG. 7 is described in the context of the application sharing program at the viewing machine, although the processing may alternatively be executed at another location and/or through another component. At step 701 of the process, the application sharing program at the viewing machine initializes each aforementioned region to zero content. At step 703, the program selects for analysis a window from the received list of windows. Typically, the window data will be listed in the list of windows in reverse z-order, and the application sharing program at the viewing machine will select windows from the list in order. Accordingly, the first window analyzed is preferably but not necessarily the lowest z-order window. At step 705, the program determines whether the current window is shared. If it is determined at step 705 that the current window is shared, then at step 707 it is determined whether the current window contains an identified document view sub-window, or intersects the current DVShared region.

If at step 707 it is determined that the current window contains an identified document view sub-window or intersects the current DVShared region, then at step 709, it is determined whether the current window intersects any shared region not in the DVShared region. If it is determined that the current window intersects a shared region not in the DVShared region, then the process flows to step 711, where the current window is added to the DVSwitch region. Subsequently at step 713, the DV rectangle of the current window, if any, is added to the DVShared region. Note that if at step 709 it is determined that the current window does not intersect a shared region not in the DVShared region, then the process flows directly to step 713.

At step 715, the DV rectangle is subtracted from the DVObscured region. Next, the process executes step 717, wherein the current window is added to the shared region. Note that if it is determined at step 707 that the current window does not contain an identified document view sub-window or intersect the current DVShared region, the process proceeds directly to step 717. After executing step 717, the process flows to step 719, where the region of the current rectangle is subtracted from the DVObscured region. If it is determined at step 720 that there are more windows from the received list of windows to be analyzed, then the process returns to step 705. Otherwise, it moves to step 721 whereat the program determines whether the DVSwitch region is a null region and the DVShared region is not a null region. If it is determined that the DVSwitch region is a null region and the DVShared region is not a null region, then at step 723, the program clips the currently shared view content using the DVShared and DVObscured regions. Otherwise, at step 725 the program clips the currently shared view content using the Shared and Obscured regions.

If at step 705 it is instead determined that the current window is not shared, then at step 706, the intersection of the current window's region and the Shared region is determined and stored. This information may be stored as a temporary region variable. Subsequently, at step 708, the determined intersection region is added to the Obscured region, and the process flows to step 710. At step 710, the determined intersection region is subtracted from the Shared region, and the process flows to step 712, wherein the determined intersection region is subtracted from the DVSwitch region. Subsequently, at step 714, the determined intersection region is clipped via intersection with the DVShared region. That is, the intersection of the determined intersection region and the DVShared region is subtracted from the determined intersection region. At step 716 the determined intersection region is subtracted from the DVShared region, after which the determined intersection region is added to the DVObscured region at step 718. From 718, the process flows to step 720 and the steps that logically follow thereafter.

Note that as mentioned above the process of generating a document view display rather than showing all application artifacts in the shared window is preferably user settable and thus may be turned off. In this case, the process described by way of FIG. 7 would not need to be executed, and the visible portions of the shared window would appear the same, other than perhaps in scale, on both the sharing machine and in the viewing machine representation.

It will be appreciated that a novel and useful system and method have been described herein for constructing a display of shared information and for displaying shared information, so that a greater percentage of a viewing area can be used to display document content rather than application artifacts. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Furthermore, although network connections are illustrated herein as lines, no limitation should thereby be imparted to the invention. Network connections may be circuit-switched, packet-switched, or otherwise, and may be transient or permanent, hard-wired or wireless, operating via any suitable protocol. Also note that although embodiments of the invention have been described largely by reference to a sharing program that is separate from the shared process, the sharing program may not be a stand-alone program, but may instead be an integral part of the shared process itself, or may be a DLL or other in-process entity.

Moreover, the exact step orders and process parameters may be varied without departing from the scope of the invention. It will be further understood that although the examples herein often refer to a sharer and a viewer computer, any number of such sharers and viewers may be involved, and a viewer may become a sharer and a sharer may become a viewer without limitation. In addition, although the foregoing description gives a number of examples wherein one or more windows are processed, no limitation to windows is intended. That is, other types of graphical display objects may also be involved in the aforementioned processes and system, so long as they can be separated into a content area and an application artifact area. Such other graphical objects include but are not limited to non-rectilinear objects rendered on the sharer display.

Furthermore, references herein to application sharing are not meant to require that all windows or material displayed on a sharer display and associated with a particular application are shared or unshared. Rather, one or more windows associated with an application running on the sharer machine are preferably sharable without requiring the sharing of all windows associated with that instance of that application. Moreover, although the steps employed to construct the viewer display are discussed herein with reference to the application sharing program of the sharing computer or the viewing computer, such steps may alternatively be executed in whole or in part at a device other than that specified in the foregoing discussion of examples.

Therefore, the invention as described herein contemplates all such embodiments as may come within the scope of the following claims and equivalents thereof.

We claim:

1. A method for displaying a representation of a shared window on a viewing display of a viewing computing device in an application sharing environment, the application sharing environment further comprising a sharing computing device communicably linked to the viewing computing device and having associated therewith a sharer display upon which is displayed the shared window, the method comprising:

receiving an entirety of the shared window wherein the shared window is a window of an application, the shared window of the application having both a document content area and an application artifact area;

identifying, by a sharing process executing at the viewing computing device, the document content area of the shared window and the application artifact area of the shared window;

displaying on the viewing display the document content area of the shared window of the application while omitting from the display the application artifact area of the shared window of the application, wherein the shared window is associated with an application running on the sharing computing device, and wherein the application artifact area comprises at least one graphical object actuatable by a user of the viewing computing device to affect the operation of the application;

receiving an indication that control of the application running on the sharing computing device has been relinquished by a user of the sharing computing device and is ceded to a user of the viewing computing device; and automatically switching a mode of operation of the application sharing program running on the viewing computing device whereby the application artifact area of the shared window is represented on the viewing display.

2. The method according to claim 1, wherein identifying a document content area of the shared window further comprises associating a parent window class of the shared window with a sub-window class associated with a sub-window within the shared window containing the document content area.

3. The method according to claim 2, wherein an application sharing program running on the viewing computing device is user alterable to enter a mode of operation wherein the application artifact area of the shared window is represented on the viewing display.

4. The method according to claim 1, wherein the viewing computing device is communicably linked to the sharing computing device via a network comprising a wide area network.

5. The method according to claim 4, wherein the wide area network comprises the Internet.

6. The method according to claim 1, wherein the viewing computing device is communicably linked to the sharing computing device via a network comprising a local area network.

7. A computer-readable memory storing instructions that, when executed, perform a method for representing a shared window of a sharer computer on a viewer display of a viewer computer, the shared window comprising a content region of an application and an artifact region of the application, the method comprising:

receiving the content region and the artifact region of the application, the content region having a first size and the artifact region having a second size, the content region and the artifact region together forming the shared window and having a third size that is a sum of the first size and the second size;

identifying by the viewer computer the content region and the artifact region of the application without any other information specifying content region and the artifact region of the application;

displaying in a region of the viewer display a representation of the shared window comprising the content region and omitting the artifact region of the application;

receiving a notification that a child window of the shared window of the application has been created on the sharer computer; and when the notification is received, modifying the representation of the shared window of the application on the viewer display to include the content region, artifact region, and child window of the application so that the shared window is displayed in the region;

receiving an indication that control of the application has been relinquished by a user of the sharer computer and is ceded to a user of the viewer computer; and automatically switching a mode of operation of the shared window on the viewing computing device whereby the application artifact area of the shared window is represented on the viewing display.

8. The computer-readable memory according to claim 7, wherein when the child window extends beyond the shared window, the modifying further comprises modifying the representation of the shared window on the viewer display so that it further comprises the extended portion of the child window.

9. The computer-readable memory according to claim 7, wherein the viewer computer is communicably linked to the sharer computer via a network comprising a wide area network.

10. The computer-readable memory according to claim 9, wherein the wide area network comprises the Internet.

11. The computer-readable memory according to claim 7, wherein the viewer computer is communicably linked to the sharer computer via a network comprising a local area network.

12. A method of constructing, on a viewer display a presentation of a shared graphical image of a shared application area, wherein the shared graphical image comprises an application artifact area of an application and an application content area of the application, the method comprising:

receiving a first set of data representing the shared application area, wherein the first set of data comprises information describing the shared graphical image;

identifying, by a sharing process executing at the viewing computing device, from the received first set of data, a shared first portion of the shared application area, wherein the identified shared first portion of the shared application area corresponds to the application content area of the application, wherein the shared application area comprises the application artifact area, the application artifact area comprising at least one graphical object actuatable by a user to affect the operation of the application, and wherein the application artifact area is not in the shared first portion of the shared application area;

displaying, on the viewer display, the identified shared first portion of the shared application area while not displaying, on the viewer display, the application artifact area of the shared application area;

receiving an indication that control of the application has been ceded to a user of the viewing computing device; and automatically switching a mode of operation of the application whereby the application artifact area of the shared application is displayed on the viewer display.

13. The method according to claim 12, wherein the displaying the identified shared first portion of the shared application area on the viewer display further comprises reducing the size of the identified shared first portion of the shared application area prior to displaying the identified shared first portion of the shared application area.

14. The method according to claim 12, further comprising:

receiving a second set of data, wherein the second set of data comprises information usable to determine that a child image of the shared graphical image has been created, wherein the child image comprises a non-null overlapping section that overlaps the identified shared first portion of the shared application area and a non-null extending section that overlaps the application artifact area; and modifying the display of the shared graphical image on the viewer display so that both the application artifact area and the content area are displayed, whereby the overlapping section and the extending section of the child image are displayed.

15. The method according to claim 14, wherein the receiving the second set of data and modifying the display of the shared graphical image are executed without intervention from a human viewer of the viewer display.

16. A computer-readable medium having thereon computer-readable instructions for performing the method of claim 12.

17. A computer-readable medium having thereon computer-readable instructions for performing the method of claim 14.

18. The method according to claim 14, wherein modifying the display of the shared graphical image so that both the application artifact area and the document content area are displayed further comprises diminishing the relative displayed sizes of the identified shared first portion of the shared application area and the child image so that entirety of the child image is displayed within the application sharing area on the viewer display.

* * * * *